United States Patent [19]
Lopata et al.

[11] 3,804,498
[45] Apr. 16, 1974

[54] CASSETTE FOR FILM

[75] Inventors: Ira L. Lopata, New York, N.Y.;
Jocob W. Hoerner, Ramsey;
Theodore A. Sloane, Towaco, both of N.J.

[73] Assignee: Ragen Precision Industries, Inc., North Arlington, N.J.

[22] Filed: Feb. 28, 1973

[21] Appl. No.: 336,695

[52] U.S. Cl. ............................. 352/78 R, 242/197
[51] Int. Cl. .......................................... G03b 23/02
[58] Field of Search............ 352/72, 78 R, 156, 157; 242/197, 71.1; 353/26; 95/31 CA

[56] References Cited
UNITED STATES PATENTS
3,700,321 10/1972 Peters .................................. 353/26
3,245,746 4/1966 Mast et al. ..................... 352/78 R X
3,227,387 1/1966 Laa et al. ........................ 242/195 X
3,679,298 7/1972 Knowles et al. ...................... 353/26
3,196,455 7/1965 Bavaro............................ 352/123 X
3,662,972 5/1972 Egan ............................. 352/78 R X FOREIGN PATENTS OR APPLICATIONS
1,277,009 9/1968 Germany .......................... 352/158

Primary Examiner—Samuel S. Matthews
Assistant Examiner—Alan Mathews
Attorney, Agent, or Firm—Popper, Bain, Bobis, Gilfillan & Rhodes

[57] ABSTRACT

A cassette for film providing a housing in which there is one space for a wound up film and a second space through which the unwound portions of the film may be lead; a passage for a projection beam of light consisting of apertures in the second space provides for the projection beam to pass through a portion of the film which has been moved out of the first space, but while it is still in the second space.

9 Claims, 6 Drawing Figures

CASSETTE FOR FILM

BACKGROUND OF THE INVENTION

1. Field of the Invention

This invention relates generally to cassettes for holding film, and specifically to cassettes wherein a portion of the film is projected while that film portion is still within the cassette.

2. Description of the Prior Art

Microfilm is now usually projected by pulling it out of cassettes and leading it to a projection station after the film has left the cassette. The manual positioning of the cassette in the projector involves the threading of the film into the projector. After the chosen frame is located and projected by withdrawing the film from the cassette, the film is rewound into the cassette. The handling of the film may impart smudges and scratches to the film and permits the deposition of dust and dirt particles. The act of selecting a cassette, mounting it in the projector, unspooling it to the proper frame, projecting that frame, rewinding the film back into the cassette, removing the cassette to its normal storage position are all acts which are time consuming and vastly increase the time expanded and the cost involved in locating information. Two patents of C. A. Irazoqui of Jan. 14, 1969 3,421,802 for an instant retrieval optical storage system and 3,456,817 of July 22, 1969 for a random access storage and retrieval system make available an apparatus and system by virtue of which almost unlimited bits of information are subject to random access storage and instant retrieval. The use of conventional cassettes in such a system would be difficult and such cassettes are not shaped for economical use of space in those devices. Nor are such cassettes of conventional character readily adaptable for projection in apparatus of this type. It has been found that a cassette for film can be devised which is ideally suited for use in a random access storage and instant retrieval system. Such a cassette has a generally wedge-shaped configuration so that it can be seated on the discs of these devices in a manner economical of space since the cassette has a generally wedge or sector shaped configuration. Furthermore the film is located in a portion of a housing which is highly resistant to penetration by dust and dirt. In addition, the housing is provided with an unspooling means which does not require the handling of the cassette or the film. In addition, the film is projected from a portion of the film which is still located within the housing, insuring minimal stress on the film at the point of projection, accurate positioning of the film for projection, providing a projection chamber which tends to resist the deposition of dirt or dust on the film or causing the film to be scratched, and enabling the unspooled portion of the film which is not projected to be shielded from dust, dirt or contact with anything that might cause it to be scratched. The cassette itself completely encloses the film when not in use.

SUMMARY OF THE INVENTION

The invention consists of a housing, preferably made of a plastic material having a high impact strength. The housing is generally wedge-shaped so that a plurality of the cassettes may be disposed about the center of a disc. At the wider end of the housing an enclosed space or storage chamber provides a seat for a roll of microfilm or the like. Immediately adjacent to that portion of the housing, guide means receive the end of a film deposited on a spool in the housing and conducts it to a slot which defines the entrance of the film into a projection area or chamber. In this second area apertures are provided in the walls of the housing for a beam of light to be projected through the housing in a direction transverse or perpendicular to the plane of film leaving the first area of the housing so that the film may be projected by a beam of light passing through the film while it is still within the housing. A seat is provided for at the extreme end of the housing to lock the leader of the film in place before the film is unspooled for projection. The cassette so devised provides for random access storage and instant retrieval when used in conjunction with the devices disclosed in the aforementioned patents. While in storage, during projection, the film is shielded from damage due to handling, or due to dust and dirt. The entire acts of retrieval are instantly achieved with random access storage to as many frames of information as can be held on a single spool and to as many spools in cassettes as can be accommodated by the size of the instant retrieval device.

THE DRAWINGS

These objects and advantages, as well as other objects and advantages may be attained by the device shown by way of illustration in the drawings in which.

PREFERRED EMBODIMENT

Figure 1:
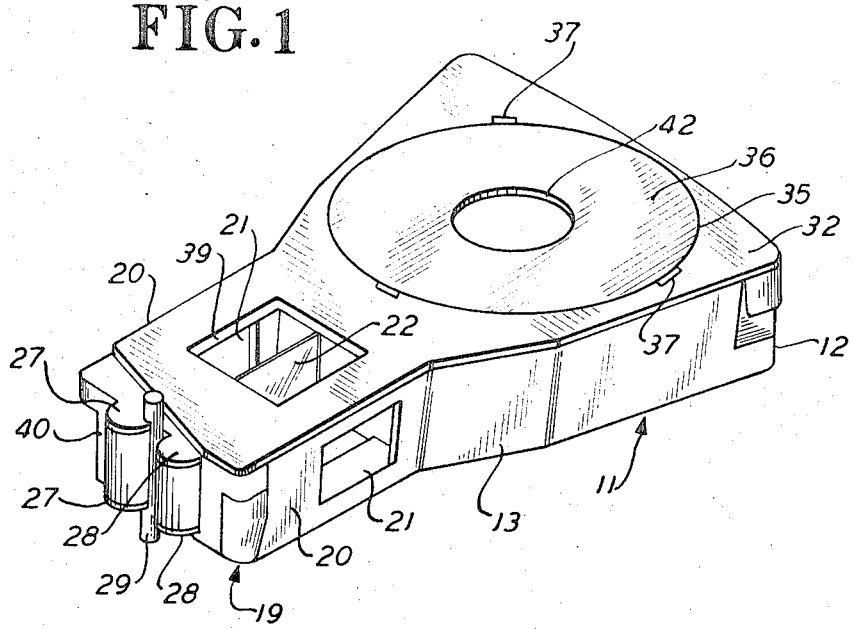
FIG. 1 is a perspective view of the cassette with a reel of film enclosed and a protective cover applied.
Figure 2:
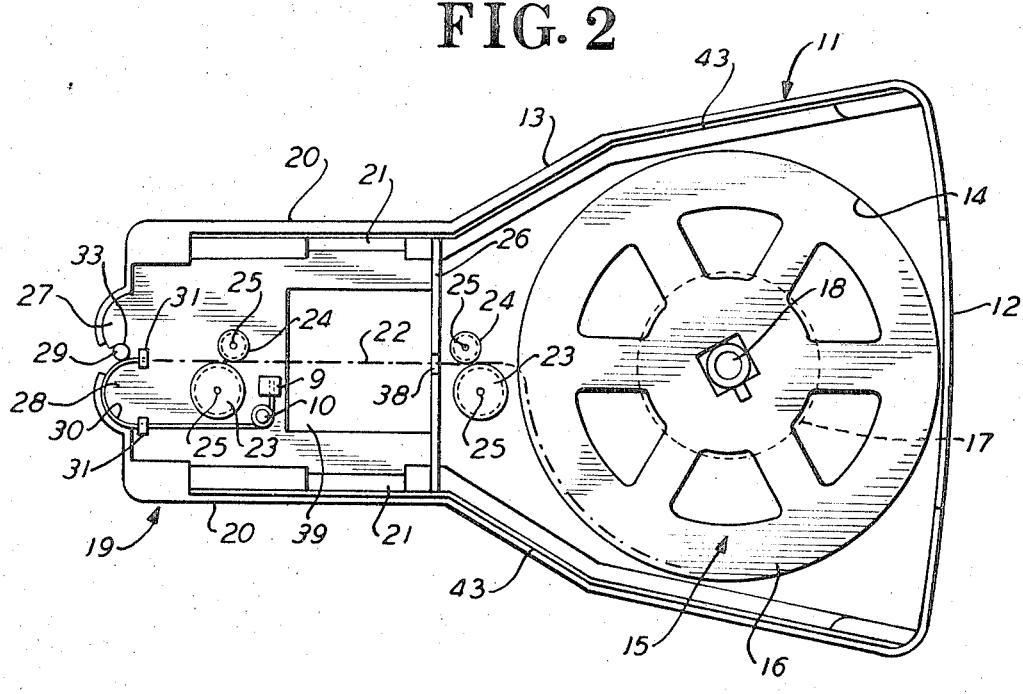
FIG. 2 is a top plan view of the cassette with the lid removed.
Figure 3:
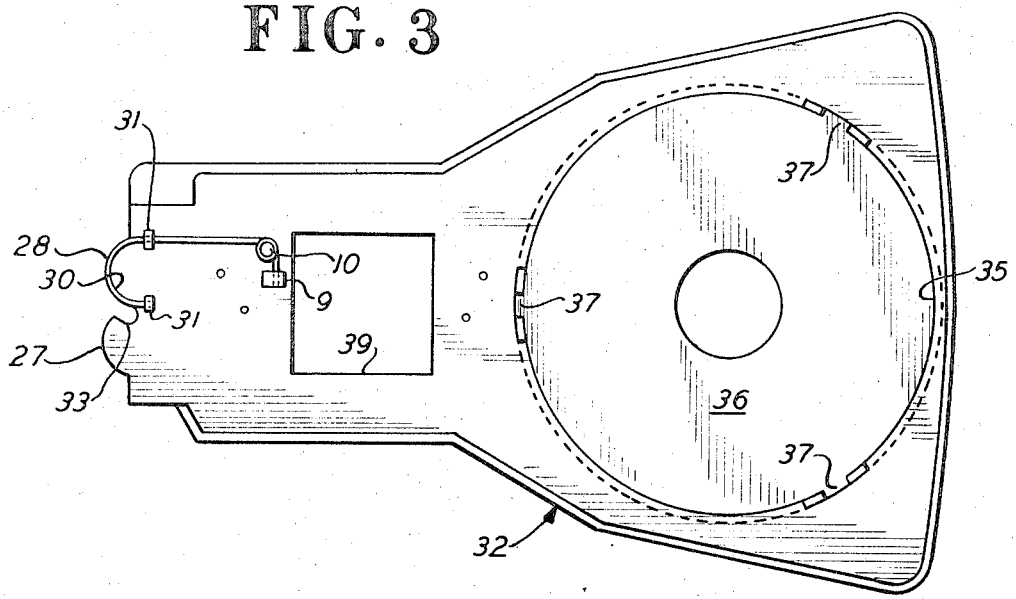
FIG. 3 is a plan view of the lid removed from the housing.
Figure 4:
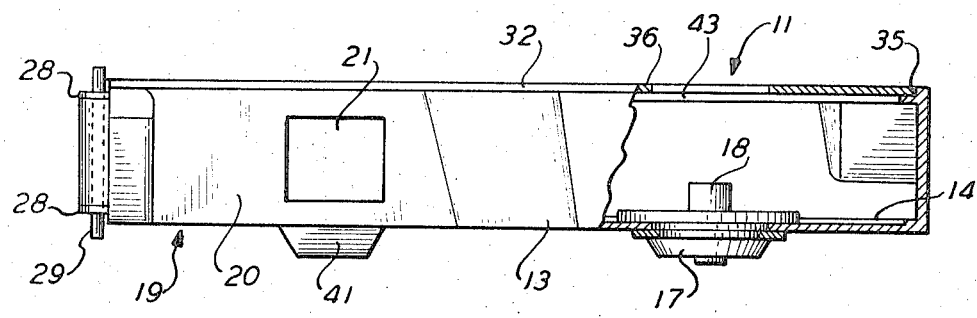
FIG. 4 is a side elevational view of the cassette with part of the film storage chamber wall exploded away.
Figure 5:
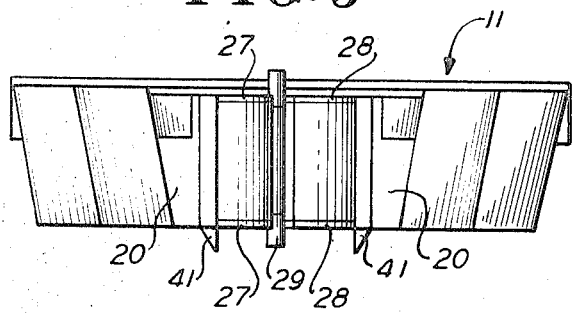
FIG. 5 is an end view of the cassette with the pin on the leader of the film latched in place to prevent unspooling.
Figure 6:
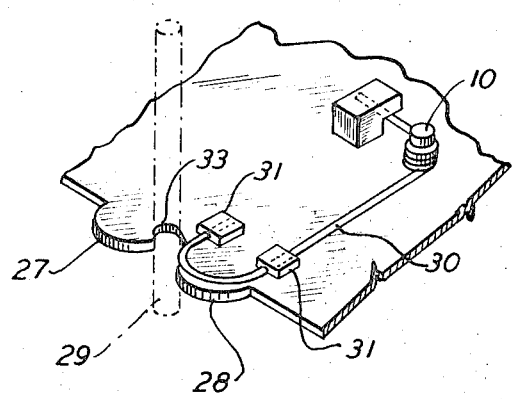
FIG. 6 is a perspective view of a portion of the housing showing the latching spring.

Referring now to the drawings in detail, the cassette provides a housing 11. The housing 11 is shaped generally as a sector of a circle so that as many as possible housings may be accommodated within the circumference of each support in the apparatus of U.S. Pat. No. 3,421,802 and 3,456,817 for use in which it is especially devised. The wide end 12 of the housing 11 is generally arcuate. There is a narrowing or constriction 13 at the waist of the housing 11. Between the end 12 and the constriction 13, an annular seat 14 is provided in the bottom of the housing 11. The seat 14 is a generally cylindrical indentation dimensioned to receive a spool of microfilm 15, or the like. In order to insure that the spool 16 be freely rotatable, a rotatable support 17 with a central axle 18 is mounted in the housing 11 at the center of the seat 14, and the hub of a spool 16 is carried by the axle 18.

The opposite end 19 of the housing 11 beyond the constriction 13 has generally parallel side walls 20 which are disposed vertically and define a projection chamber. Each of these walls 20 has an aperture 21, designed to permit the passage of light from a projection lamp through the housing and through the film 22 from the spool 15. To accurately position the film 22 in the housing 11 in the light passage defined by apertures 21, so that it will be disposed properly with respect to the beam of light emitted by a projection lamp, a pair of guides 23, 24 is mounted on each side of the light passage. The guides 23, 24 are rollers carried on pins 25 and are freely rotatable. The pins 25 are attached to the housing 11 and a lid 32.

Beyond the first pair of guides 23, 24 a wall 26 defines the film storage chamber on one side of the wall 26 and a projection chamber on the other side; the film 22 is passed through a slot 38 in the wall 26. The slot 38 keeps dirt and dust away from the microfilm spool 15. The lid 32 is applied to the open top of the housing 11. It is seated on the flanges 43.

Beyond the second pair of guides, 23, 24, the opposite end 19 of the housing 11 and the lid 32 have pairs of top and bottom semicircular tabs 27, 28. The top and bottom opposing tabs 27, 27 are rigidly secured together by a rod. These tabs 27, 27 are each provided with a notch or seat 33, 33 for a locating pin 29, secured to the end of the film 22. A pair of springs 30 lie on the opposite pair of top and bottom semicircular tabs 28, 28. These springs 30 have semicircular ends and are each constrained by two ears 31 molded into the housing 11 at the bottom, and to a lid or cover plate 32, which defines the top of the housing. The springs are also anchored to the housing 11, and cover plate 32 by being wrapped around stubs 10 formed integral with the housing 11 and cover plate 32. A lug 9 in the housing 11 and on the cover plate 32 captures the end of the springs 30 under tension.

The cover plate 32 has an opening 35 for the introduction of the film spool 16 into the housing. The springs 30 are arcuate, with a radius sufficiently great to encroach upon the radious of the notches or seats 33 and normally urge the locating pin 29 into seated engagement on the notches 33. Thus, when the film 22 is in the housing 11 and is not in use, the pin 29 at the end of the film is latched in the seats 33 by the springs 30, so that the film will not become unspooled. Instead of latching springs 30, numerous other means for holding the pin on the end of the film 22 may be substituted (as for example, magnets, clips, deformable lips on the edge of the seats 33, etc.)

Once a spool of film 15 is installed in the housing 11, a dust cover 36 is applied to the opening 35 in the lid 32 to protect the film 22. The cover 36 has a central port 42 to admit a key to the spool of film 15 to permit it to be rewound. The dust cover 36 may be provided with a bayonet pin 37, to lock the cover 36 in place by engagement with suitable channels in the housing 11, or the cover 36 may be cemented in place.

The cassette 11 accommodates a standard spool which may be dropped into place. No special spool is required. The film does not have to be rewound on a special spool in order to operate in the system. No permanent built-in spool is required.

The film is lead between the first pair of guides 23, 24 through the slot 38, across the light passage defined by the apertures 21, 21 between the second pair of guides 23, 24 and out of the end of the housing. The pin 29 can then be attached to the end of the film. In addition to the vertical apertures 21, 21, the lid 32 and the housing 11 have top and bottom access ports 39 for maneuvering the film through the second pair of guides 23, 24. The end of the housing is closed by the upturned edge 40 on the cover. For positioning the housing 11 with the film 22 at a projection station, enlargements 41 are provided at the bottom of the housing, so that the film will be properly positioned with respect to the course of the beam of light passing through the openings 21.

While reference has been made to a cassette for film, or microfilm, it is to be understood that the cassette may also be used for magnetic tape, and the recording or pick up heads may be introduced into the apertures 21.

We claim:

1. A cassette for film comprising
   a. a housing having a generally, longitudinally tapered construction to enable maximum radial disposition of cassettes in a random access apparatus,
   b. a storage chamber for a spool of film at the wider end of the tapered housing,
   c. a means for rotatably supporting a spool of film in the storage chamber,
   d. a pair of film guides in the storage chambers for guiding film away from a spool in the storage chamber,
   e. a projection chamber for film adjacent to the storage chamber, at the narrower end of the housing,
   f. a pair of film guides in the projection chamber adjacent to the end thereof,
   g. side apertures in said projection chamber for a beam of light to pass through the chamber and through a film extending between both pairs of film guides,
   h. an access port in the top of housing at the projection chamber, positioned between the pairs of guides, and extending on both sides of the course defined by a film extending between both pairs of guides, for allowing the vertical entry into the projection chamber of a means to maneuver a film,
   i. a film withdrawal port in the projection chamber for the end of the film to be engaged for movement of the film through the projection chamber and out of the housing until a preselected portion of the film is in registration with the side apertures for projection,
   j. a port in the housing for the entry of a key into the storage chamber to rewind film.

2. A cassette according to claim 1 and
   a. an aperture in the housing over the storage chamber dimensioned to permit the insertion of a film into the storage chamber,
   b. a cover for the aperture engageable and disengageable with the housing.

3. A cassette according to claim 1 and a means to hold the end of a film at the film withdrawal port.

4. A cassette according to claim 3 in which the means to hold the end of a film at the film withdrawal port comprises
   a. a notch on the housing defining a seat for a pin attached to the end of a film which extends out of the withdrawal port,
   b. a spring attached to the housing, encroaching on the notch, and normally urging a pin into seated engagement with the notch.

5. A cassette according to claim 1 and
   a. a transverse wall in the housing between the storage chamber and the projection chamber, b. a slit in the wall in general registration with a plane defined by the path of a film extending linearly from between the pair of film guides in the storage chamber to the pair of film guides in the projection chamber.

6. A cassette according to claim 3 and
 a. a spool of film in the storage chamber,
 b. the end of the film passed through both pairs of film guides and out through the film withdrawal port,
 c. a pin attached to the end of the film,
 d. the pin engaged with the means to hold the end of the film.

7. A cassette according to claim 4 and
 a. a spool of film in the storage chamber,
 b. the end of the film passed through both pairs of film guides and out through the film withdrawal port,
 c. a pin attached to the end of the film, and seated in the notch and engaged by the spring.

8. A cassette for film according to claim 1 and enlargments at the bottom of the housing for positioning the cassette with the film therein disposed for projection.

9. A cassette for film comprising
 a. a housing having a generally, longitudinally tapered construction to enable maximum radial disposition of cassettes in a random access apparatus,
 b. a storage chamber for a spool of film at the wider end of the tapered housing,
 c. a means for rotatably supporting a spool of film in the storage chamber,
 d. a pair of film guides in the storage chambers for guiding film away from a spool in the storage chamber,
 e. a projection chamber for film adjacent to the storage chamber, at the narrower end of the housing,
 f. a pair of film guides in the projection chamber adjacent to the end thereof,
 g. side apertures in projection chamber for a beam of light to pass through the chamber and through a film extending between both pairs of film guides,
 h. an access port in the top of housing at the projection chamber, positioned between the pairs of guides, and extending on both sides of the course defined by a film extending between both pairs of guides, for allowing the vertical entry into the projection chamber of a means to maneuver a film,
 i. a film withdrawal port in the projection chamber for the end of the film to be engaged for movement of the film through the projection chamber and out of the housing until a preselected portion of the film is in registration with the side apertures for projection,
 j. a port in the housing for the entry of a key into the storage chamber to rewind a film,
 k. an aperture in the housing over the storage chamber dimensioned to permit the insertion of a film into the storage chamber,
 l. a cover for the aperture engageable and disengageable with the housing,
 m. a notch on the housing defining a seat for a pin attached to the end of a film which extends out of the withdrawal port,
 n. a spring attached to the housing, encroaching on the notch, and normally urging a pin into seated engagement with the notch,
 o. a transverse wall in the housing between the storage chamber and the projection chamber,
 p. a slit in the wall in general registration with a plane defined by the path of a film extending linearly from between the pair of film guides in the storage chamber to the pair of film guides in the projection chamber,
 q. a spool of film in the storage chamber,
 r. the end of the film passed through both pairs of film guides and out through the film withdrawal port,
 s. a pin attached to the end of the film, and seated in the notch and engaged by the spring,
 t. enlargements at the bottom of the housing for positioning the cassette with the film therein disposed for projection.

* * * * *